(12) United States Patent
Ansley

(10) Patent No.: US 9,094,641 B1
(45) Date of Patent: Jul. 28, 2015

(54) GROUP OF PICTURES SIZE ADJUSTMENT

(75) Inventor: Carol J. Ansley, Johns Creek, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 791 days.

(21) Appl. No.: 13/155,443

(22) Filed: Jun. 8, 2011

(51) Int. Cl.
| | |
|---|---|
| H04N 7/12 | (2006.01) |
| H04N 7/26 | (2006.01) |
| H04N 7/32 | (2006.01) |
| H04N 11/02 | (2006.01) |
| H04N 19/61 | (2014.01) |
| H04N 19/00 | (2014.01) |
| H04N 21/23 | (2011.01) |

(52) U.S. Cl.
CPC .. *H04N 7/50* (2013.01); *H04N 7/26* (2013.01); *H04N 21/23* (2013.01)

(58) Field of Classification Search
CPC ....... H04N 7/50; H04N 7/26; H04N 7/26271; H04N 7/26244; H04N 7/26053; H04N 7/26941
USPC ............................ 375/240.02, 240.12, 240.26
See application file for complete search history.

(56) References Cited

U.S. PATENT DOCUMENTS

| | | | |
|---|---|---|---|
| 6,643,327 B1 * | 11/2003 | Wang ...................... | 375/240.12 |
| 8,677,431 B2 * | 3/2014 | Smith .............. | 725/95 |
| 2002/0021756 A1* | 2/2002 | Jayant et al. ........... | 375/240.16 |
| 2005/0147383 A1* | 7/2005 | Ihara ............................. | 386/69 |
| 2009/0080519 A1* | 3/2009 | Jeong et al. .............. | 375/240.08 |
| 2009/0083813 A1* | 3/2009 | Dolce et al. ..................... | 725/93 |
| 2009/0193485 A1* | 7/2009 | Rieger et al. ................. | 725/114 |
| 2009/0207866 A1* | 8/2009 | Cholas et al. ................. | 370/505 |
| 2009/0210899 A1* | 8/2009 | Lawrence-Apfelbaum et al. ............................. | 725/34 |
| 2010/0111108 A1* | 5/2010 | Akgul et al. .................. | 370/474 |
| 2012/0128062 A1* | 5/2012 | Mehta et al. ............. | 375/240.02 |

* cited by examiner

*Primary Examiner* — Jessica M Prince
*Assistant Examiner* — On S Mung
(74) *Attorney, Agent, or Firm* — Troy A. Van Aacken

(57) ABSTRACT

Various methods, systems, and apparatuses can be used to adjust the group of pictures size for an encoder during encoding operations. In some implementations, group of pictures size can be reduced during periods of higher likelihood of channel change, and increased during periods of lower likelihood of channel change. Such adjustment can facilitate faster display of pictures after a channel change due to anchor frames being more quickly received.

14 Claims, 10 Drawing Sheets

US 9,094,641 B1

GROUP OF PICTURES SIZE ADJUSTMENT

TECHNICAL FIELD

This disclosure relates to adjusting the group of pictures (GoP) characteristics of a digital video stream.

BACKGROUND

The video distribution industry involves many telecommunication companies and many types of telecommunication networks. Their common denominator is a broadband data facility that can be used to distribute digital video information. For example, multiple services operators (MSO) use their CATV network infrastructure to transmit video content signals, but in addition they transport data traffic, as well as, carrying voice, video on demand (VoD) and video conferencing traffic signals, among other types.

The content provided over these networks has become increasingly sophisticated and demanding of bandwidth for its transport. Such sophisticated content can include, for example, high definition (HD) content, as well as metadata, and other enriched content. Moreover, the increase in the sophistication and sheer volume of content on video networks has led to increased use of encoding and compression of video content in order to fit the content through the network. This increase in encoding and compression can lead to an increased burden to the set top box (e.g., including DVRs, PVRs, etc.), which decodes and/or decompresses the incoming stream. Some facets of this increased encoding/compression can cause latency delays in executing channel change requests.

BRIEF DESCRIPTION OF THE DRAWINGS

Like reference numbers and designations in the various drawings indicate like elements.

DETAILED DESCRIPTION

In some implementations of this disclosure, systems and methods can operate to adjust the GoP size during periods when there is an increased probability of receiving a channel change request. For example, when an advertisement is about to play, the GoP size may be adjusted downward so as to facilitate the ability to more quickly decode the incoming stream and fill the input buffer at the decoder. However, the decreased GoP size leads to increased bandwidth consumption by the video stream. Thus, during periods when the channel being watched is expected to remain steady, the size of the GoP can be increased, thereby reducing bandwidth consumption. In other examples, it can be inferred that users switch channels at the top and bottom of the hour (e.g., when television programs change). In such examples, the GoP can be reduced at the top and bottom of the hour for some defined window, and then increased during the main portion of the program. In still further examples, the stream provided by a video source can include tags (or triggers) that allow a video encoder to sense when a channel change is likely. Alternatively, the set top box can include a channel surf detection module operable to detect periods of increased likelihood that a channel change will be requested by user, thereby allowing the encoder to adjust the GoP size appropriately.

Figure 1:
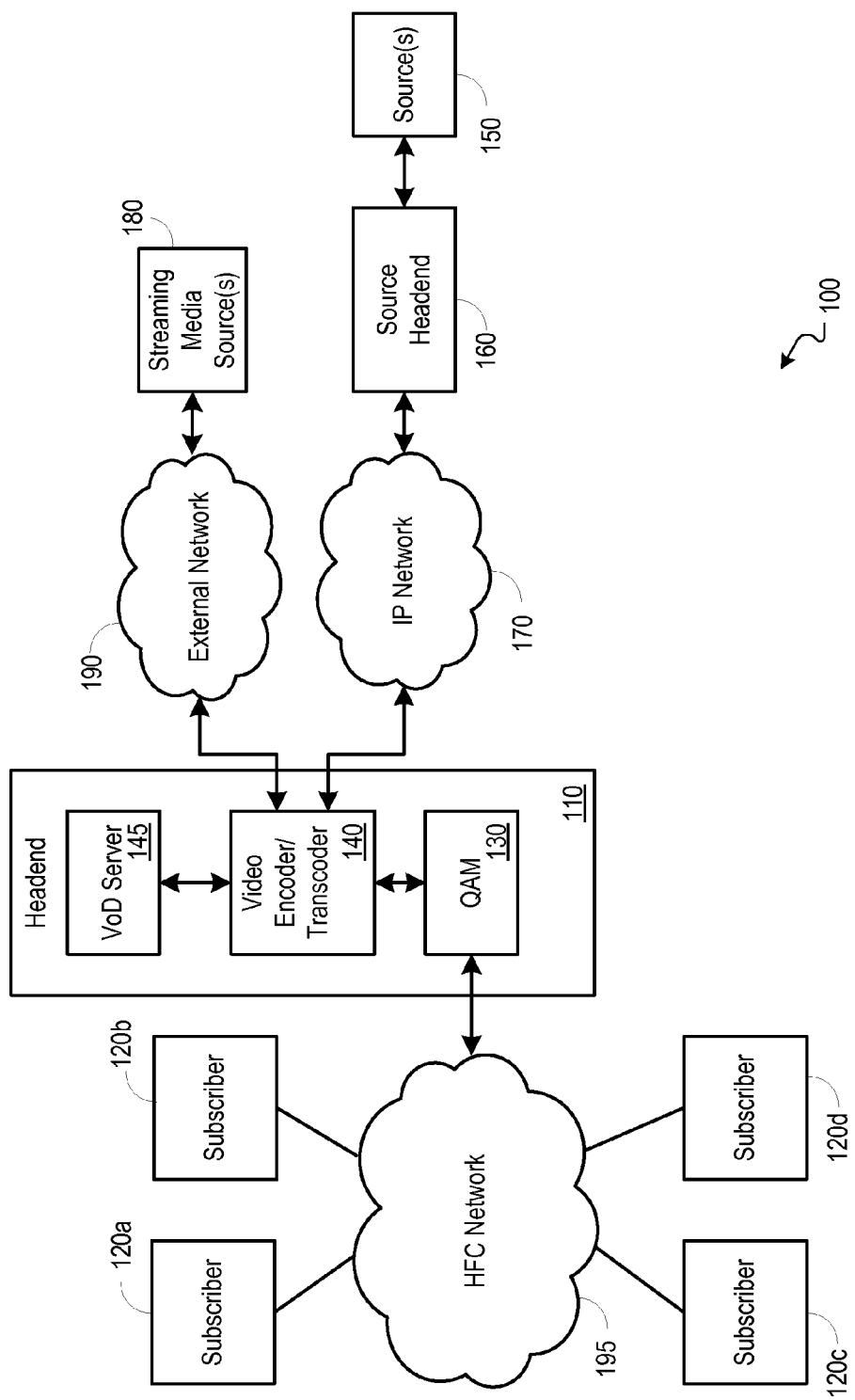
FIG. 1 is a block diagram illustrating an example network environment operable to provide group of pictures (GoP) size adjustment.

FIG. 1 is a block diagram illustrating an example network environment operable to provide group of pictures (GoP) size adjustment. In some implementations, a headend 110 can provide video, data and/or voice service(s) to one or more subscribers 120a-d (e.g., cable modem(s) and/or set-top box(es)). The headend 110 can include devices such as an edge quadrature amplitude modulation (EQAM) device 130 and a video encoder/transcoder 140. Video streams can be received from a video source (or sources) 150 through a source headend 160 via a network(s) 170 (e.g., including an IP network). In some implementations, these video streams can enter the headend as raw moving picture experts group (MPEG) streams, or any other streaming video protocol supported by the headend 110 and/or EQAM device 130. In the case of unencoded video, the video encoder/transcoder 140 can encode the video into a digital video format supported by the recipient device(s). In the case of encoded video (e.g., MPEG-2/MPEG-4 video), the video encoder/transcoder 140 can transcode the video to provide for a better transmission characteristics (e.g., compression ratio, bandwidth, etc.) for transport across the hybrid fiber-coax (HFC) network 195.

In other implementations, video streams can be received by the video encoder/transcoder 140 from a video on demand (VOD) server 145. The VOD server can receive requests for video service via the video encoder/transcoder 140, and provide the requested video to the video encoder/transcoder 140. The video encoder/transcoder 140 can address the video to one or more subscribers 120a-d and forward the addressed video to the QAM for modulation onto a carrier signal.

Data services can be handled by the headend 110 through a CMTS (not shown). The CMTS can receive data signals from subscribers 120a-d and server(s) 180 through an external network(s) 190 (e.g., including the Internet). The network(s) 190, for example, can operate using Internet protocol (IP), sending data packets to and receiving data packets from the headend 110. In some examples, the CMTS can be paired with a SIP proxy server (not shown) operable to provide voice over internet protocol (VoIP) services with connectivity to the public switched telephone network (PSTN). In still further examples, one or more video sources 150 may provide streaming data through the network(s) 190 to the CMTS.

In some implementations, the video encoder/transcoder 140 can forward encoded video packets to the EQAM device 130 used to modulate the video stream onto a carrier waveform. In various implementations, the carrier waveform can include both data and video streams, in both multicast and unicast (e.g., point-to-point) formats for transmission to a combiner, which can combine multiple signals onto a single fiber for transmission to one or more subscribers 120a-d via a hybrid fiber-coax (HFC) network 195. In other implementations, a CMTS can be used to receive a video stream from the video encoder/transcoder 140 and can be operable to modulate a baseband signal to a carrier wave and transmit the signal to a combiner for upconversion to a transmission frequency (e.g., DOCSIS downstream channel). In various implementations, edge termination devices (e.g., including CMTS, EQAM systems, wireless access points, and wireless base stations, among others) can include a combiner operable to multiplex multiple baseband signals into multiple RF channels for output to one or more ports.

In some implementations, the video encoder/transcoder can be operable to include a GoP size adjustment module. The GoP size adjustment module can be used to adjust the size of the GoP construct while encoding a video stream for transport to the user. In some implementations, the video stream can include triggers operable to alert the video encoder/transcoder when to increase or decrease the GoP size for the output video stream.

In other implementations, the GoP size adjustment module can identify when to adjust the size of the GoP used for the output video stream. For example, the GoP size adjustment module can detect or predict when an advertisement is going to occur and begin to reduce the GoP size for the output video stream. In other examples, the GoP size adjustment module can infer from the time when a channel change is more likely to occur and can reduce the GoP size when it is inferred that a channel change is more likely to occur.

In various implementations, the GoP size is dynamic, and can be adjusted according to a defined function. The defined function can be continuous (e.g., sinusoidal) or discontinuous (e.g., step function). The function can be defined, for example, by an administrator or by an MSO operating the video encoder/transcoder 140.

Another source for GoP size adjustment timing can be a user behavior analysis module within a headend system or within a set top box. The module tracks user behavior and predicts when an encoder could safely increase the GoP size without reducing the user's channel change time, and likewise can reduce the GoP size for relatively limited periods without substantially increasing the overall bandwidth consumed.

Figure 2:
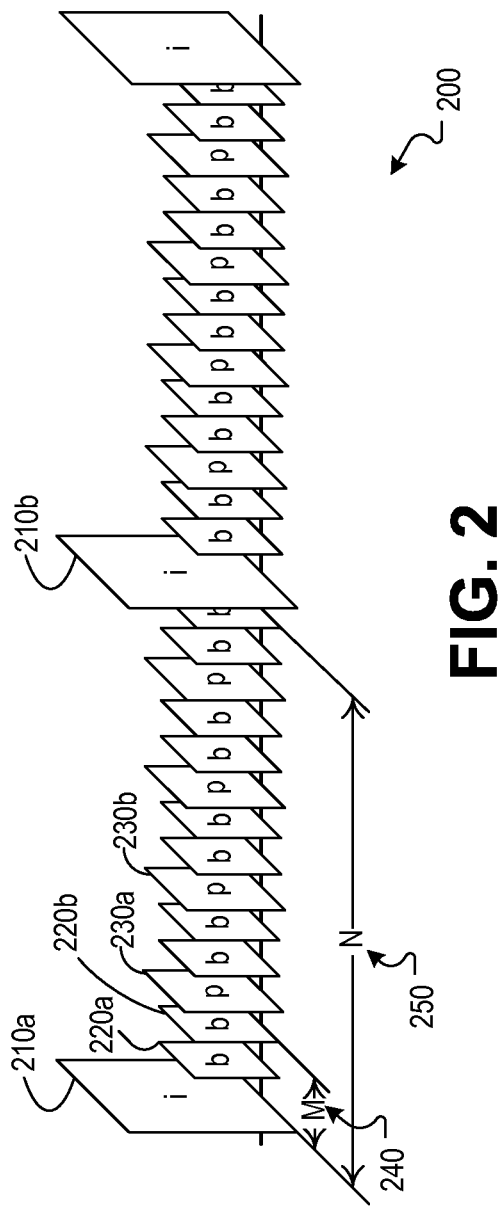
FIG. 2 is a block diagram illustrating an example digital video stream using the GoP concept.

FIG. 2 is a block diagram illustrating an example digital video stream 200 using the GoP concept. A GoP can include an i-frame 210a and all succeeding frames until the next i-frame 210b (excluding the subsequent i-frame). This set is typically referred to a group of pictures or GOP because the subsequent frames depend upon the initial i-frame and subsequent frames. In "closed" GoP constructs, the frames in a GoP depend only upon those frames in the GoP. In "open" GoP constructs, some b-frames in the GoP may depend upon one or more frames from the next GoP.

It should be understood that i-frames 210a-b and p-frames 230a-b are generally referred to as anchor frames. Anchor frames can be those frames which can be used as reference for other frames. The i-frame 210a-b is known as an "intra-coded" frame. Thus, all information used to decode the frame is included within the i-frame 210a-b. However, p-frames 230a-b and b-frames 220a-b typically depend upon anchor frames to be decoded.

The p-frame 230a-b is also known as a "predictive coded" frame. Thus p-frames are "predictive" and can depend upon only preceding anchor frames. Thus, for example, p-frame 230a typically depends on i-frame 210a, while p-frame 230b typically depends on p-frame 230a.

The b-frames 220a-b are known as "bi-directional predictive coded" frames. Thus, such frames are "bi-directional" and can depend upon both preceding frames and succeeding frames. For example, the first b-frame 220a will typically depend upon the preceding i-frame 210a, and the succeeding p-frame 230.

The size of a GoP can be discussed using two different variables. The first variable (M) 240 can identify the distance (e.g., number of frames) between anchor frames, while the second variable (N) 250 can identify the distance between i-frames. In the example shown in FIG. 2, the GoP size would be M=3 and N=15. While this disclosure typically discusses the GoP size adjustment in terms of the "N" parameter, it should be understood that lowering the "M" parameter can also lead to faster production of a picture on a display after receiving a channel change request. Thus, the systems and methods described to reduce the GoP size disclosed herein apply to adjustment of either of the "M" and "N" parameters, individually, or in combination.

Typically, the i-frames 210a-b are the largest frames, followed by the p-frames 230a-b, and the b-frames 220a-b are the smallest frames. Thus, the larger the distance between i-frames 210a-b the better compression that can be obtained on the video stream 200. While setting the GoP size is typically seen as a tradeoff in video quality for bandwidth, increased GoP size can also reduce responsiveness of the set top box to channel change requests.

Figure 3A:
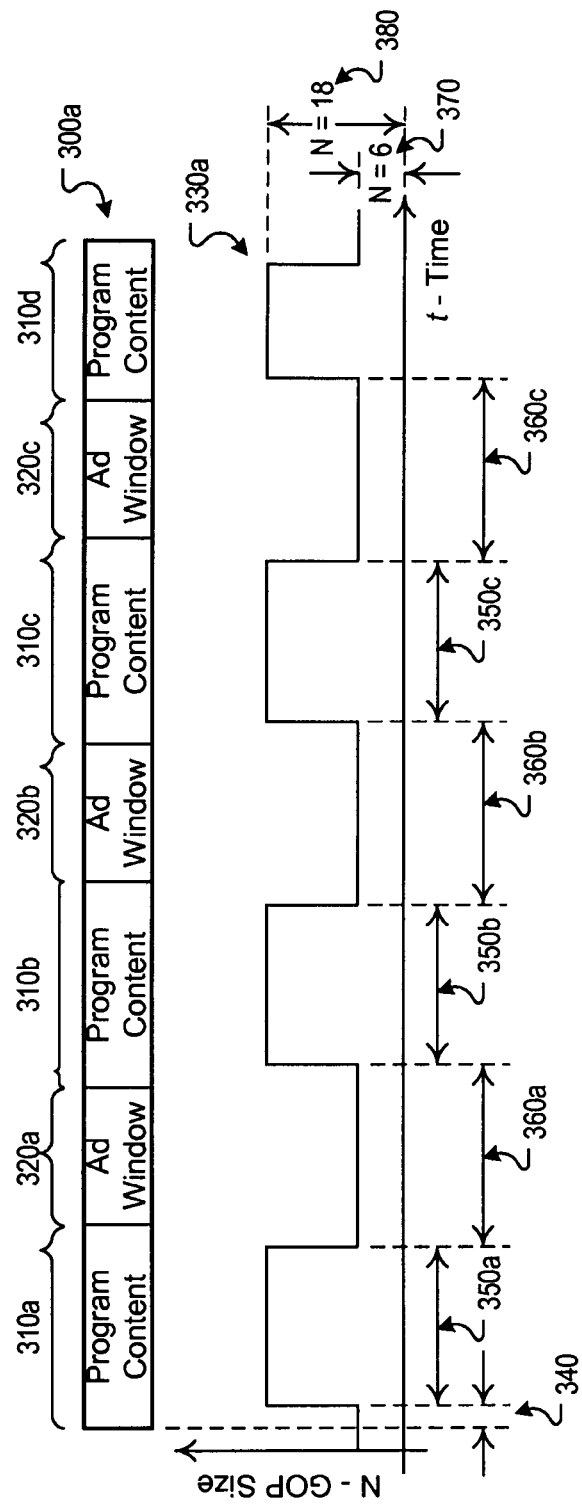
FIGS. 3A-B are block diagrams illustrating example flows that can be used to adjust the GoP size and example functions that can be used to identify the size associated with the GoP size adjustment.

FIG. 3A is a block diagram illustrating an example flow that can be used to adjust the GoP size and an example function that can be used to identify the adjustment to be made to the GoP size. A video stream 300a can include a plurality of video segments including program content segments 310a-d and advertising window segments 320a-c interspersed between the program content segments 310a-d.

In some implementations, a function 330a can be used to define the GoP size. In the example shown in FIG. 3A, the function can include a number of periods 350a-c during which the GoP size is set high and a number of periods 360a-c during which the GoP size is set low. In this example, during the periods 350a-c where the GoP size is set high, N is set at 18. During periods 360a-c wherein the GoP is set low, N is set at 6. Various other sizes and/or functions can be used to define the high and low values.

In some implementations, the low periods 360a-c can extend into the program content segments 310a-c by some period of time 340. Extension of the low periods 360a-c into the program content segments 310a-d can help to ensure that channel changes for some period of time before and after the advertisement are made during periods where the GoP size is set low. In alternative implementations, the low periods 360a-c can be co-extensive with the program content segments 310a-d. In other alternative implementations, the high periods 350a-c can extend into the advertising window segments 320a-c.

Figure 3B:
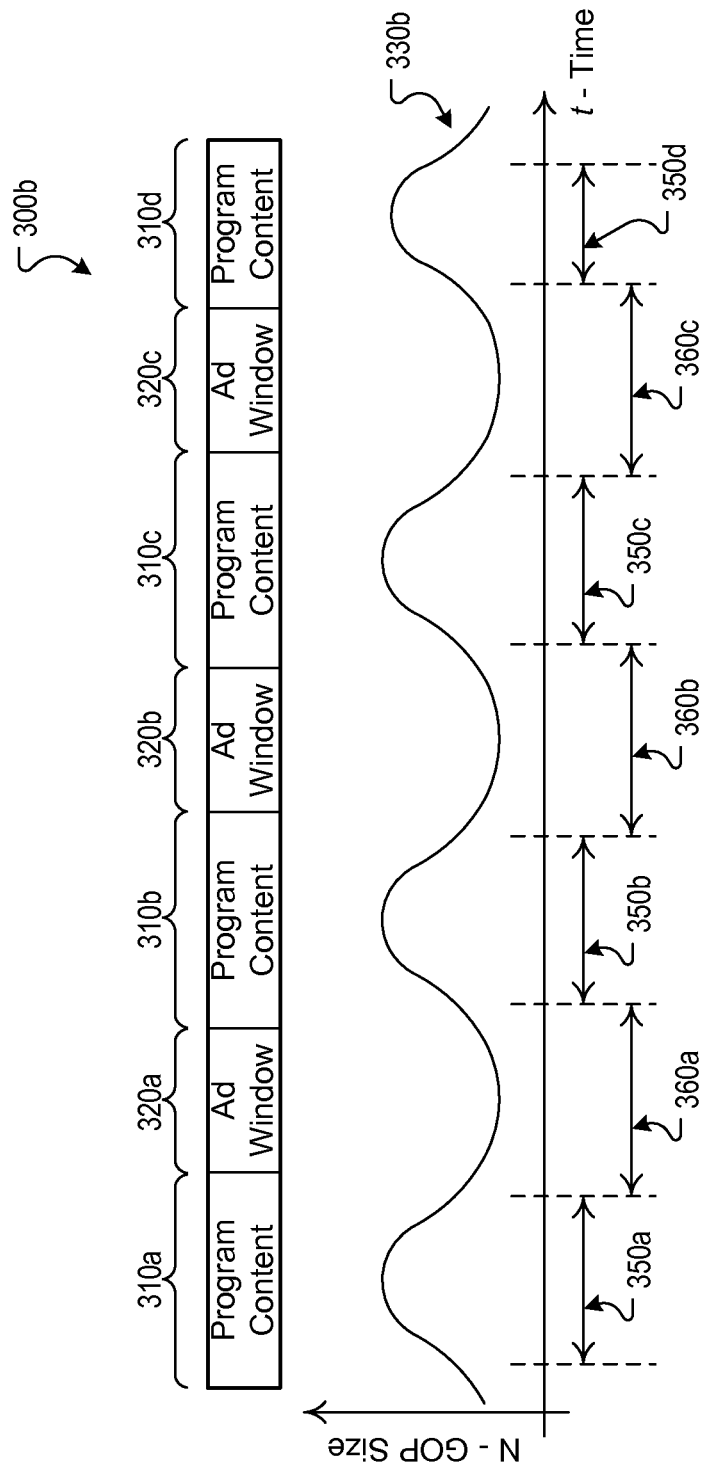

FIG. 3B is a block diagram illustrating another example function 330b that can be used to identify the adjustment to be made to the GoP size. In this example, it should be noted that the stream 300b is identical in content to the stream 300a of FIG. 3A, including four program content segments 310a-d and three ad window segments 320a-c. In some implementations, the function 330b chosen to control the size of the GoP adjustment can be a sinusoidal wave. In the example of FIG. 3B, the sinusoidal wave 330b is used to adjust the GoP size to be high during periods 350a-d corresponding to the main program content segments 310a-d, and low during periods 360a-c corresponding to the ad window segments 320a-c.

In some implementations, the high periods 350a-d can be shortened to provide low periods 360a-c during the program content segments, thereby facilitating faster channel change beyond commercial breaks (e.g., advertising window segments 320a-c). In other implementations, the high periods 350a-d can extend into commercial breaks to encourage users not to change channels during commercial breaks.

While the above examples have been described in terms of advertisement, other triggers can be used to identify the beginning of a period during which there is a higher likelihood to receive a channel change. For example, the headend can be equipped to receive feedback from the users and identify points in a program, or points in time, where the users are most likely to change channels. These can be used as input to the video encoder/transcoder to trigger adjustment to the GoP size.

Figure 4:
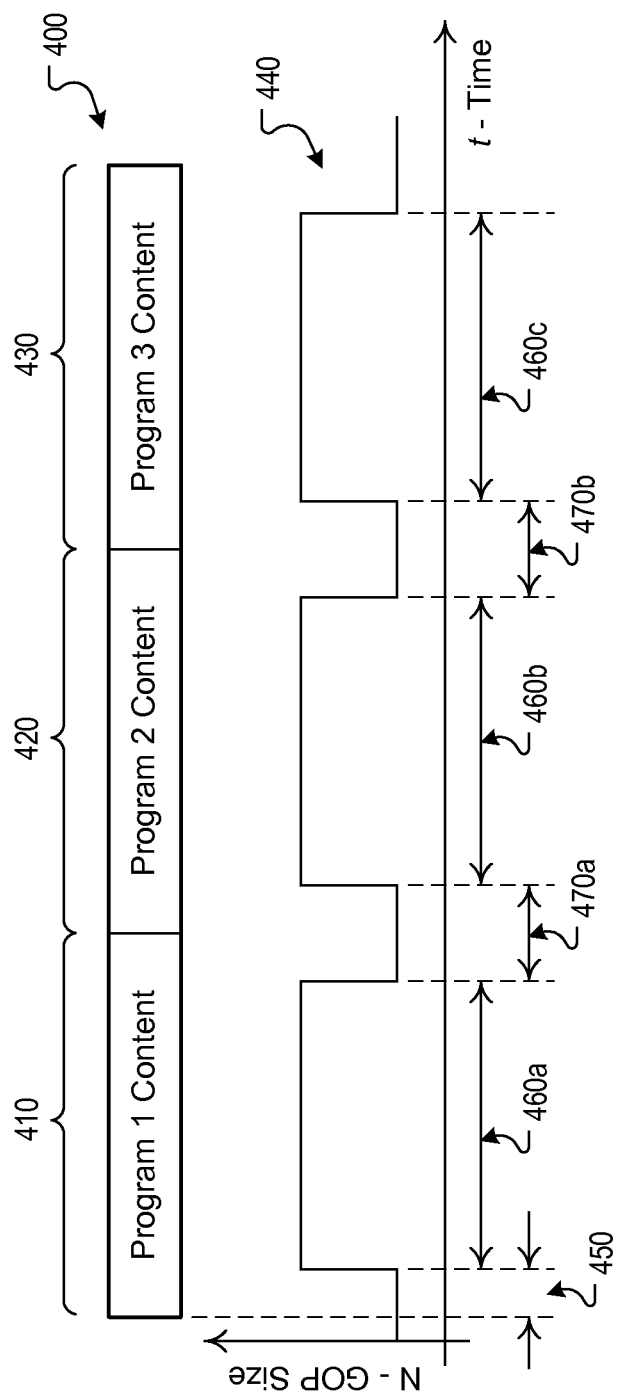
FIGS. 4-5 are a block diagrams illustrating alternative example flows that can be used to adjust the GoP size.

FIG. 4 is a block diagram illustrating an alternative example flow that can be used to adjust the GoP size. In this example, we can ignore the effects that advertisements have on channel change behavior and concentrate on the effect that television program changes (e.g., the television program at 8:00 pm might last 30 minutes, so the next television program starts at 8:30 pm). Typically, users tend to change channels at the end or beginning of programs. Thus, one can infer that the user is more likely to request a channel change at the top or bottom of the hour.

Thus, in the example of FIG. 4, during the main portion 460a of a program 1 content segment 410, the function 440 defines that the GoP size will be large. Then during a transition period between the program 1 content segment 410 and a program 2 content segment 420 there exists a period 470a during which it has been determined that the user is more likely to request a channel change. During this period 470a, the function defines that the GoP size will be reduced, thereby facilitating a faster decode of the signal and faster buffer fill. Similarly, during the main portion 460b of program content 420, the function 440 defines the GoP size to be increased. Then during a transition period 470b between program 2 content segment 420 and program 3 content segment 430, the function 440 defines the GoP size to be reduced, before increasing the GoP size in a main portion 460c of program 3 content segment 430.

It should be understood that intra-program adjustment of GoP size and inter-program adjustment of GoP size can be combined in some implementations. Thus, for example, intra-program GoP size adjustments may be smaller than inter-program GoP size adjustments, or vice-versa, depending on the observed channel change behavior of users.

Figure 5:
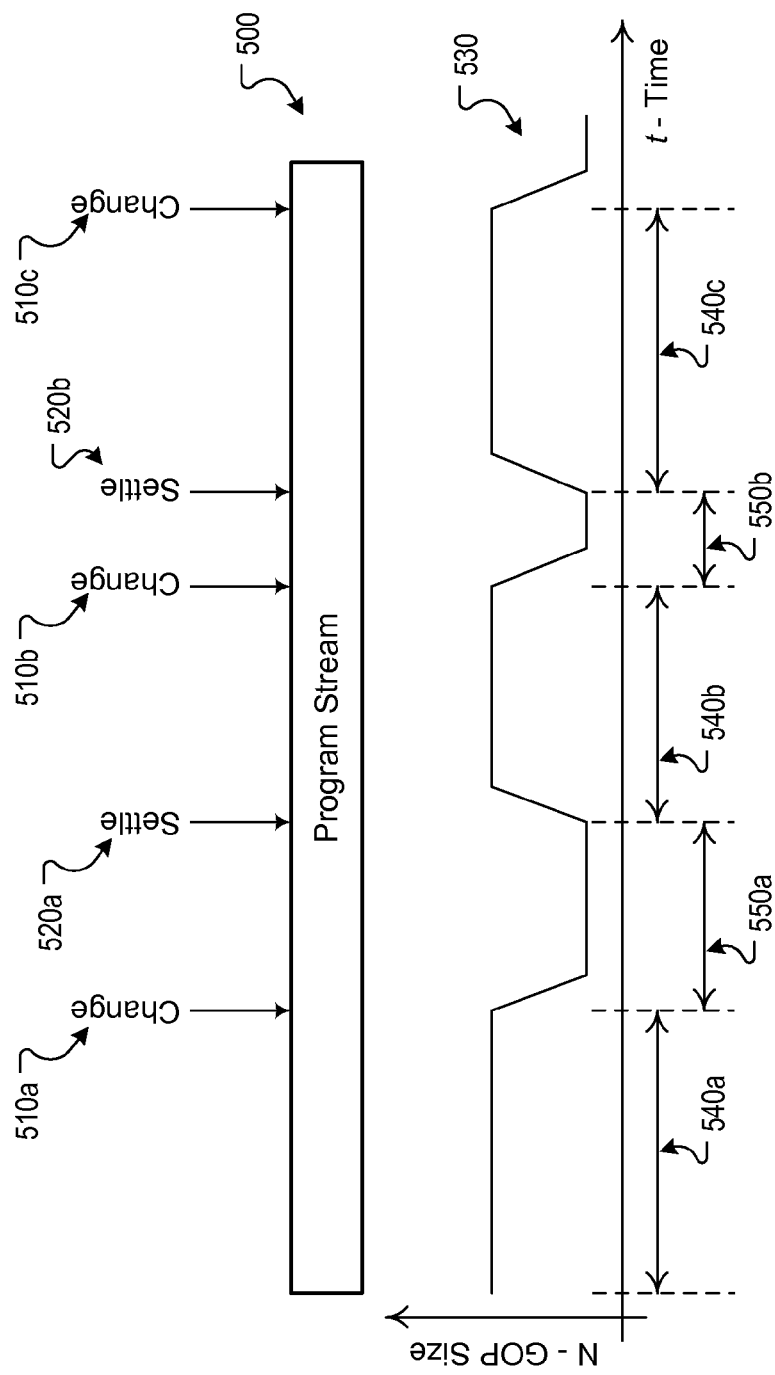

FIG. 5 is a block diagram illustrating an alternative example flow that can be used to adjust the GoP size of a video stream 500. In some implementations, the video encoder/transcoder can use triggers 510a-c, 520a-b to identify when channel changes are more likely to occur. Thus, during initial normal operation 540a, a function 530 is operable to set the GoP size to be large. Then, upon receiving a change trigger 510a, the video encoder/transcoder can be instructed to reduce the GoP size to a smaller level defined by the function 530.

The GoP size can remain constant during a period 550a of increased likelihood of channel change. Then, upon receiving a trigger that the period of channel change has ended (e.g., a settle trigger 520a), the function 530 can increase the GoP size to be large again. The period 540b during which the GoP size is set to be large can continue until another change trigger 510b is received. The function 530 then operates to reduce the GoP size to the small level for period 550b, until a settle trigger 520b is received. The function 530 then defines the GoP size to be large for a period 540c lasting until a next change trigger 510-c is received.

It should be understood that the change and settle triggers 510a-c, 520a-b can be provided through various interfaces. In some implementations, the change and settle triggers 510a-c, 520a-b can be provided by the set top box. In such implementations, the set top box may include a channel surf detection module operable to detect when a user enters and exits a channel surf mode. In other implementations, the video stream source itself can tag the video data with the change and settle triggers 510a-c, 520a-b to identify periods during which the user is more likely to request a channel change. In still further implementations, the headend can observe user behavior and decide when users are most likely to request channel changes, and use this information to define the change and settle triggers within the programming.

Figure 6:
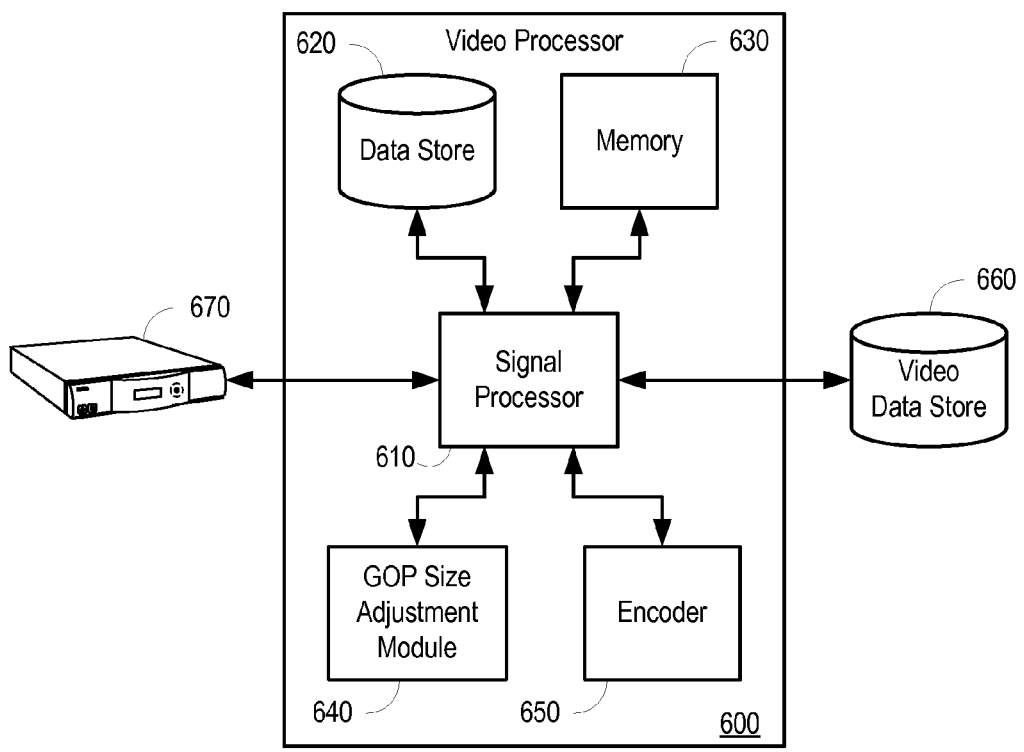
FIG. 6 is a block diagram illustrating an example digital video encoder having a GoP size adjustment module.

FIG. 6 is a block diagram illustrating an example video processor 600 (e.g., digital video encoder, digital video transcoder, etc.) having a GoP size adjustment module. In some implementations, the video processor 600 can include a signal processor 610, a data store 620, a memory 630, a GoP size adjustment module 640, and an encoder 650. The signal processor 610 can operate to receive video data from a video data store 660 and send encoded signals to a modulator (e.g., eQAM 670).

The data store 620 can operate to store data (e.g., encoding parameters) used in the encoding process as well as various data resulting from the encoding process (e.g., event traps, data usage, etc.). The memory can be used as an input and output buffer for the video processor 600. The signal processor 610 can store incoming video data into memory 630 until the encoder is available to process the video data. The signal processor 610 can also store encoded video stream to memory 630 to reduce the chance of jitter in the output video stream.

While shown separately, the encoder 640 may reside as a program executed by the signal processor 610 to receive the incoming video data and to encode the video data into a digital format. Typically, encoding the video data into digital format includes slicing the video data into frames, identifying i-frames, p-frames and b-frames, and encoding the individual pixel data into digitized information bits.

In some implementations, the GoP size adjustment module 650 can operate to adjust the size of the GoP encoding parameters stored in the data store 620 and used by the encoder. The GoP size adjustment module 650 can also operate to determine when adjustments should be made to the GoP size, and what kind of adjustment should be made. In some implementations, the adjustment to the GoP size can be dynamic spectrum of adjustments (e.g., based upon the likelihood that a channel change request will be received). Thus, in such implementations, if a channel change is highly likely, the GoP size can be adjusted higher than if a channel change is only moderately likely. Likewise, the GoP size can be adjusted lower if a channel change is highly unlikely than if a channel change is moderately unlikely, or to a midway size if channel change is as equally likely as not.

Figure 7:
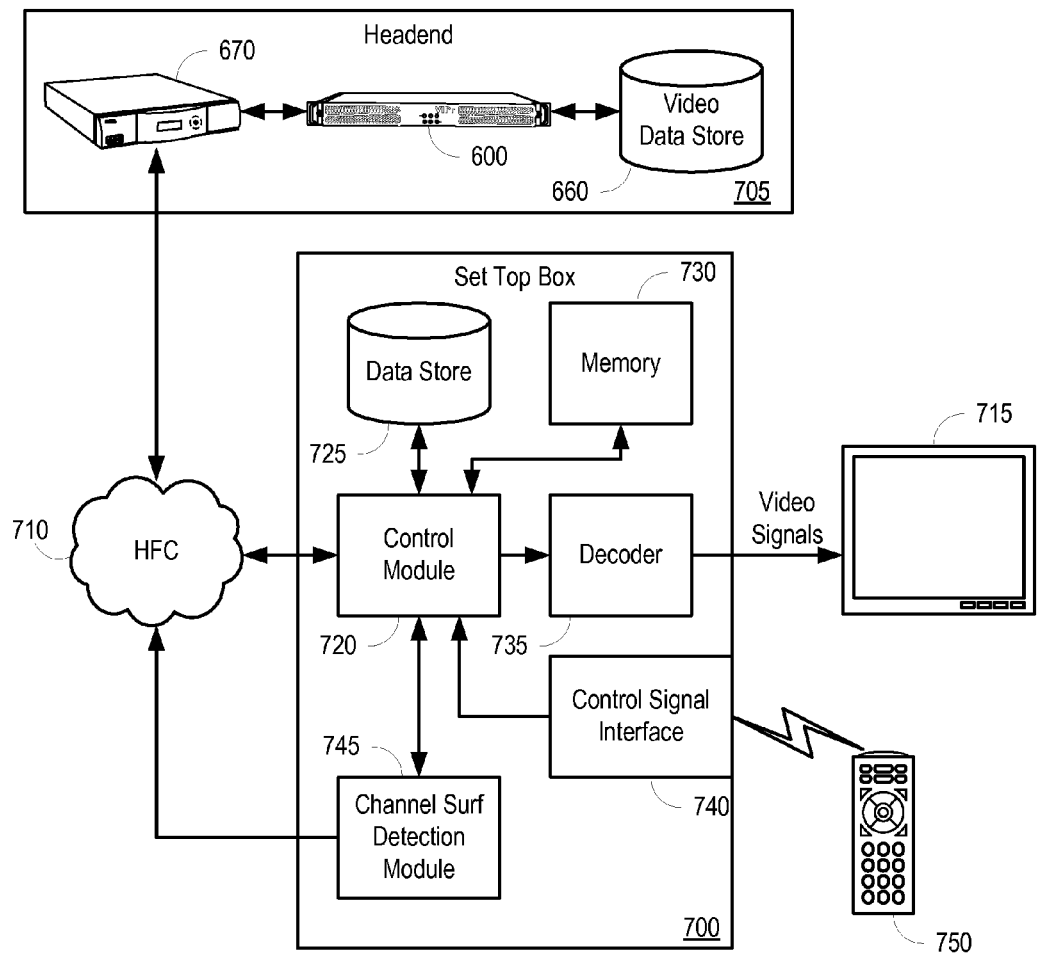
FIG. 7 is a block diagram illustrating an example digital video encoder having a GoP size adjustment module.

FIG. 7 is a block diagram illustrating an example set top box 700 operable to trigger periods of higher likelihood of channel change to a headend 705 through an HFC network 710. In some implementations, a set top box 700 can include a control module 720 (e.g., a processor), a data store 725, a memory 730, a decoder 735, a control signal interface 740, and a channel surf detection module 745.

In some implementations, the control module 720 can retrieve content from the data store 725. In those implementations where the content data is stored as part of the data store 725, the content can be communicated to the control module via a bus interface from the data store 725. Alternatively, the content and/or advertisements can be communicated to the control module from a headend 705 through an HFC network 710.

In some implementations, the control module can specify which frames to retrieve from the data store 725. For example, while in trick mode, the control module may only request a subset of frames based upon the requested trick mode functionality. Upon receiving the content and/or advertisement data, the control module 720 can forward the content and/or advertisement data to a decoder 735. In some implementations, in addition to storing content data, the data store 725 can also store program guide data and decoding/decryption parameters for decoding the incoming video stream.

In some implementations, the decoder 525 can operate to decode the incoming video stream. The incoming video stream can be stored to an input buffer (e.g., memory 730) before being operated upon by the decoder, in order to avoid jitter in the video data produced to a display device 715. The incoming video stream can be encoded in a variety of different formats, compressed or uncompressed. The decoded content data information can be stored to a buffer (e.g., memory 730) before being be communicated to a display device 715.

In some implementations, control signals can be communicated from a remote control device 750 to a control signal interface 740. While the link in FIG. 7 is shown as a direct link from the remote control to the set top box 700, it should be understood that the link may include intermediate devices (such as, e.g., a set top box, a gateway device, one or more network nodes, repeaters, and other network elements). The control signals can operate to provide requests to the control module 720. The control module 720 can take actions based upon the requests received through the control signal interface 740.

The channel surf detection module 745 can be operable to receive control signal indications through the control module 720. In some implementations, the channel surf detection module 745 can identify periods during which the user appears to be channel surfing and communicate those periods to the headend 705. The headend can use the identification of channel surfing periods as an identification of when to reduce the GoP size used by the video encoder/transcoder 600.

It should be understood that channel surfing can be detected in various ways. In some examples, channel surfing can be detected by identifying two or more channel change requests within a specified period of time. After entering channel surfing mode, a period of inactivity can be inferred as ending the channel surfing period. Other triggers can be used to identify the beginning and end of channel surfing periods.

Figure 8:
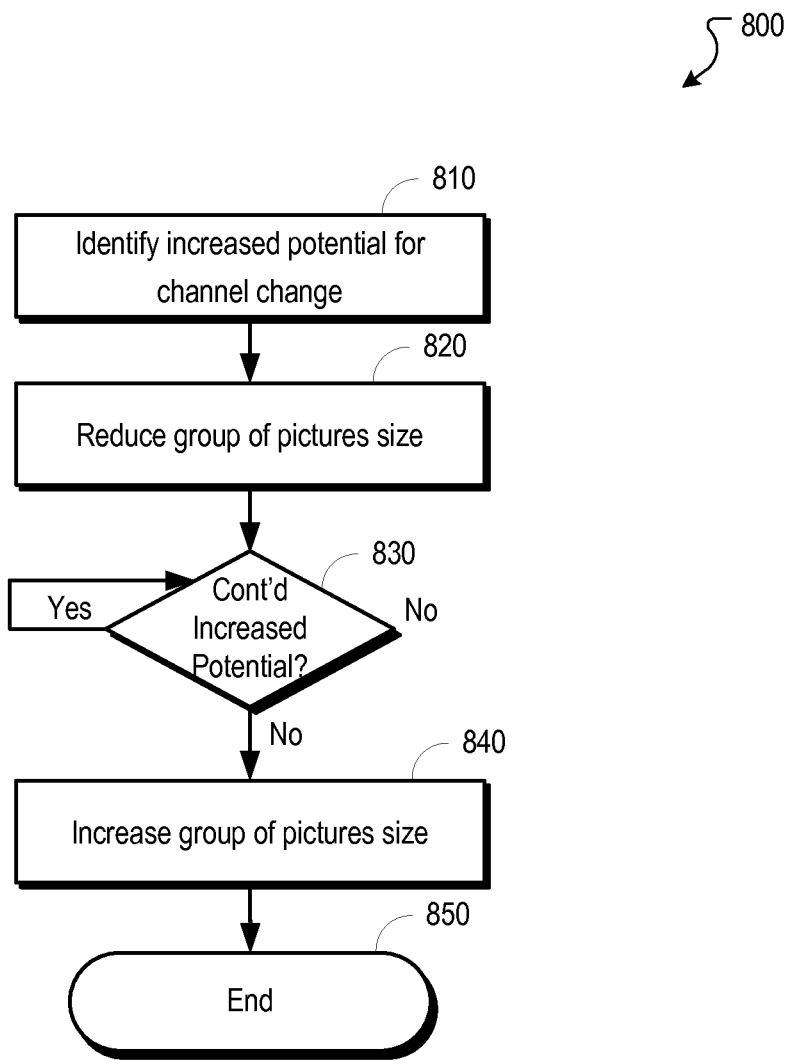
FIG. 8 is a flowchart illustrating an example process to adjust GoP size.

FIG. 8 is a flowchart illustrating an example process 800 to adjust GoP size. The process 800 begins at stage 810, where an increased potential for channel change activity is identified. The increased potential for channel change can be identified, for example, by a GoP size adjustment module (e.g., GoP size adjustment module 640 of FIG. 6). In some implementations, the increased potential for channel change can be identified based upon receipt of triggers from a set top box device. In other implementations, the increased potential for channel change can be identified by an upcoming commercial break, the end of a program, an observed historical behavior, any other trigger.

At stage 820, the size associated with the GoP is reduced. The size of the GoP can be reduced, for example, by a GoP size adjustment module (e.g., GoP size adjustment module 640 of FIG. 6) in conjunction with an encoder/transcoder (e.g., encoder 650 of FIG. 6). Various functions can be used to define the adjustment to be made to the GoP size, including, for example, step functions, ramp functions, sinusoidal functions, etc.

At stage 830, a determination is made whether a period of increased potential for channel change continues. The determination can be made, for example, by a GoP size adjustment module (e.g., GoP size adjustment module 640 of FIG. 6) and/or a channel surf detection module (e.g., channel surf detection module 745 of FIG. 7). In some implementations, the end of a channel change probability can be inferred from a period of inactivity from the control signal interface. In other implementations, the end of a channel change probability can be inferred from program start times, historical viewing activity, user profiles, the end of an advertisement window, etc., and combinations thereof. If a determination is made that the period of increased probability of channel change continues, the process 800 continues to cycle until the end of such period is identified.

If the end of a period of increased channel change probability is identified, at stage 840 the GoP size can be increased. The GoP size can be increased, for example, by a GoP size adjustment module (e.g., GoP size adjustment module 640 of FIG. 6) in conjunction with an encoder/transcoder (e.g., encoder 650 of FIG. 6). In some implementations, the size of the GoP can be varied on a continuous function based upon the likelihood of receiving a channel change. The process 800 ends at stage 850.

Figure 9:
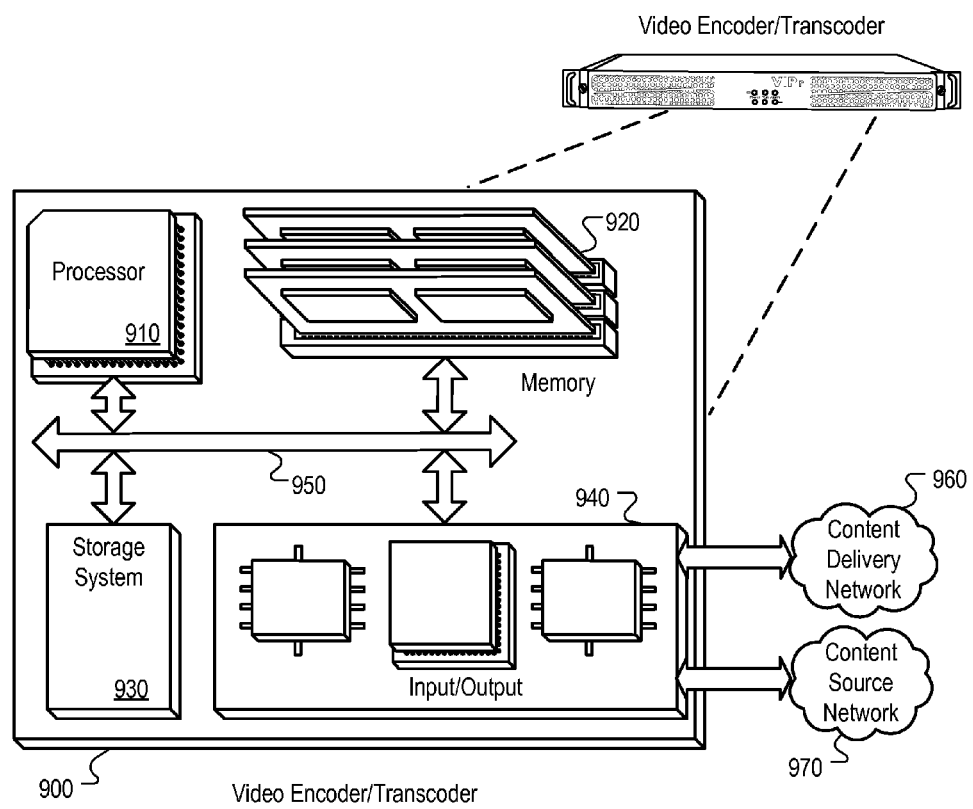
FIG. 9 is a component diagram of an example video encoder operable to adjust the GoP size during encoding/transcoding functions.

FIG. 9 is a component diagram of an example video encoder/transcoder 900 operable to adjust the GoP size during encoding/transcoding functions. The video encoder/transcoder 900 can include a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the device 900. In one implementation, the memory 920 is a computer-readable medium. In one implementation, the memory 920 is a volatile memory unit. In another implementation, the memory 920 is a non-volatile memory unit.

In some implementations, the storage device 930 is capable of providing mass storage for the device 900. In one implementation, the storage device 930 is a computer-readable medium. In various different implementations, the storage device 930 can include, for example, a hard disk device, an optical disk device, flash memory or some other large capacity storage device.

The input/output device 940 provides input/output operations for the device 900. In one implementation, the input/output device 940 can interface to a content delivery network 960 or a content source network 970. In addition, such input/output device 940 can communicate with other external devices through various interfaces such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a content delivery network 960 and/or content source network 970), as well as sending communications to, and receiving communications from various networks (not shown).

The video encoder/decoder of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a digital signal processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular implementations of the subject matter described in this specification have been described. However, it should be understood that other implementations are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method, comprising:
identifying one or more periods within a program stream when there exists an increased potential for subscribers to request to join the program stream;
during the one or more identified periods, reducing a size associated with a group of pictures within the program stream;
during periods outside of the one or more identified periods, increasing the size of the group of pictures within the program stream; and
wherein identifying one or more periods of increased potential for subscribers to request to join the program stream comprises identifying one or more advertising windows, wherein the size of the group of pictures is a function of the one or more advertising windows, and
wherein the function comprises a sinusoidal function whereby the size of the group of pictures associated with the program stream encoding is at a trough during the one or more advertisement windows and is at a peak during a content section of the program stream.

2. The computer-implemented method of claim 1, wherein the function comprises a step function whereby the size of the group of pictures associated with the program stream encoding is set at a first value during the one or more advertisement windows and is set at a second value during a content section of the program stream.

3. The computer-implemented method of claim 1, further comprising decreasing the size of the group of pictures associated with the program stream encoding during a first period prior to the one or more advertising windows and increasing the size of the group of pictures associated with the program stream during a second period after the one or more advertising windows.

4. The computer-implemented method of claim 1, wherein identifying one or more periods of increased potential for subscribers to request to join the program stream comprises identifying the end of a first program content and the start of a second program content.

5. The computer-implemented method of claim 1, wherein the size of the group of pictures varies as a function of proximity to the end of the first program content and the start of a second program content.

6. The computer-implemented method of claim 1, wherein identifying one or more periods of increased potential for subscribers to request to join the program stream comprises:
compiling a history of channel changes associated with a subscriber or group of subscribers;
analyzing the history of channel changes associated with the subscriber or group of subscribers; and
identifying one or more points during the program stream when the subscriber or group of subscribers is more likely to request a channel change.

7. The computer-implemented method of claim 6, wherein identifying the one or more points during the program stream when the subscriber or group of subscribers is more likely to request a channel change comprises identifying points relative to advertisement breaks or program content changes.

8. One or more non-transitory computer readable media operable to be executed by a processor, the one or more non-transitory computer readable media upon execution by the processor being operable to cause the processor to:
identify one or more periods within a program stream when there exists an increased potential for subscribers to request to join the program stream;
vary a size associated with a group of pictures encoding within the program stream as a function of the one or more identified periods of increased potential for subscribers to request to join the program stream; and
wherein identifying one or more periods of increased potential for subscribers to request to join the program stream comprises identifying one or more advertising windows, wherein the size of the group of pictures is a function of the one or more advertising windows, and
wherein the function comprises a sinusoidal function whereby the size of the group of pictures associated with the program stream encoding is at a trough during the one or more advertisement windows and is at a peak during a content section of the program stream.

9. The one or more non-transitory computer readable media of claim 8, wherein the function comprises a step function whereby the size of the group of pictures associated with the program stream encoding is set at a first value during the one or more advertisement windows and is set at a second value during a content section of the program stream.

10. The one or more non-transitory computer readable media of claim 8, further comprising decreasing the size of the group of pictures associated with the program stream encoding during a first period prior to the one or more advertising windows and increasing the size of the group of pictures associated with the program stream during a second period after the one or more advertising windows.

11. The one or more non-transitory computer readable media of claim 8, wherein identifying one or more periods of increased potential for subscribers to request to join the program stream comprises identifying the end of a first program content and the start of a second program content.

12. The one or more non-transitory computer readable media of claim 8, wherein the size of the group of pictures varies as a function of proximity to the end of the first program content and the start of a second program content.

13. The one or more non-transitory computer readable media of claim 8, wherein identifying one or more periods of increased potential for subscribers to request to join the program stream comprises:
compiling a history of channel changes associated with a subscriber or group of subscribers;
analyzing the history of channel changes associated with the subscriber or group of subscribers; and
identifying one or more points during the program stream when the subscriber or group of subscribers is more likely to request a channel change.

14. The one or more non-transitory computer readable media of claim 13, wherein identifying the one or more points during the program stream when the subscriber or group of subscribers is more likely to request a channel change comprises identifying points relative to advertisement breaks or program content changes.

* * * * *